United States Patent [19]
Suzuki

[11] Patent Number: 5,857,065
[45] Date of Patent: *Jan. 5, 1999

[54] OPTICAL DATA COMMUNICATION SYSTEM AND PRINTER

[75] Inventor: Katsuyoshi Suzuki, Tokyo, Japan

[73] Assignee: Asahi Kogaku Kogyo Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 644,965

[22] Filed: May 15, 1996

[30] Foreign Application Priority Data

May 15, 1995 [JP] Japan ................................. 7-116025

[51] Int. Cl.$^6$ .......................................... G06K 9/22
[52] U.S. Cl. ................... 395/114; 358/473; 340/825.69
[58] Field of Search ................... 395/114, 116; 340/825.69, 825.72; 364/143, 144; 358/473, 442; 345/126, 169, 905; H04N 1/04; G06K 9/22

[56] References Cited

U.S. PATENT DOCUMENTS

| | | |
|---|---|---|
| 4,791,492 | 12/1988 | Nagashima .............................. 358/255 |
| 4,856,090 | 8/1989 | Kitani et al. ............................ 455/687 |
| 5,046,066 | 9/1991 | Messenger .............................. 370/94.1 |
| 5,047,864 | 9/1991 | Fujito ....................................... 358/296 |
| 5,247,380 | 9/1993 | Lee et al. ................................. 359/118 |
| 5,307,297 | 4/1994 | Iguchi et al. ......................... 364/708.1 |
| 5,481,249 | 1/1996 | Sato ................................... 340/825.06 |
| 5,490,287 | 2/1996 | Itoh et al. ................................. 455/66 |
| 5,503,483 | 4/1996 | Petteroti et al. .......................... 400/88 |
| 5,524,185 | 6/1996 | Na ........................................... 395/114 |
| 5,631,637 | 5/1997 | Ueda ................................. 340/870.28 |
| 5,757,354 | 5/1998 | Kawamura .............................. 345/905 |

*Primary Examiner*—Kim Yen Vu
*Attorney, Agent, or Firm*—Kane, Dalsimer, Sullivan, Kurucz, Levy, Eisele and Richard, LLP

[57] ABSTRACT

An optical communication system for a printer includes an infrared light emitting diode for emitting a radiation for transmitting a printing data, an infrared receiver for receiving the printing data transmitted with the radiation, a printer body to which the printing data is supplied through the infrared receiver, a microcomputer for detecting a state of data transmission of the printing data, an indicator light emitting diode for indicating the state of transmission in accordance with the microcomputer so that the state of printing data transmission is visible to a user.

12 Claims, 6 Drawing Sheets

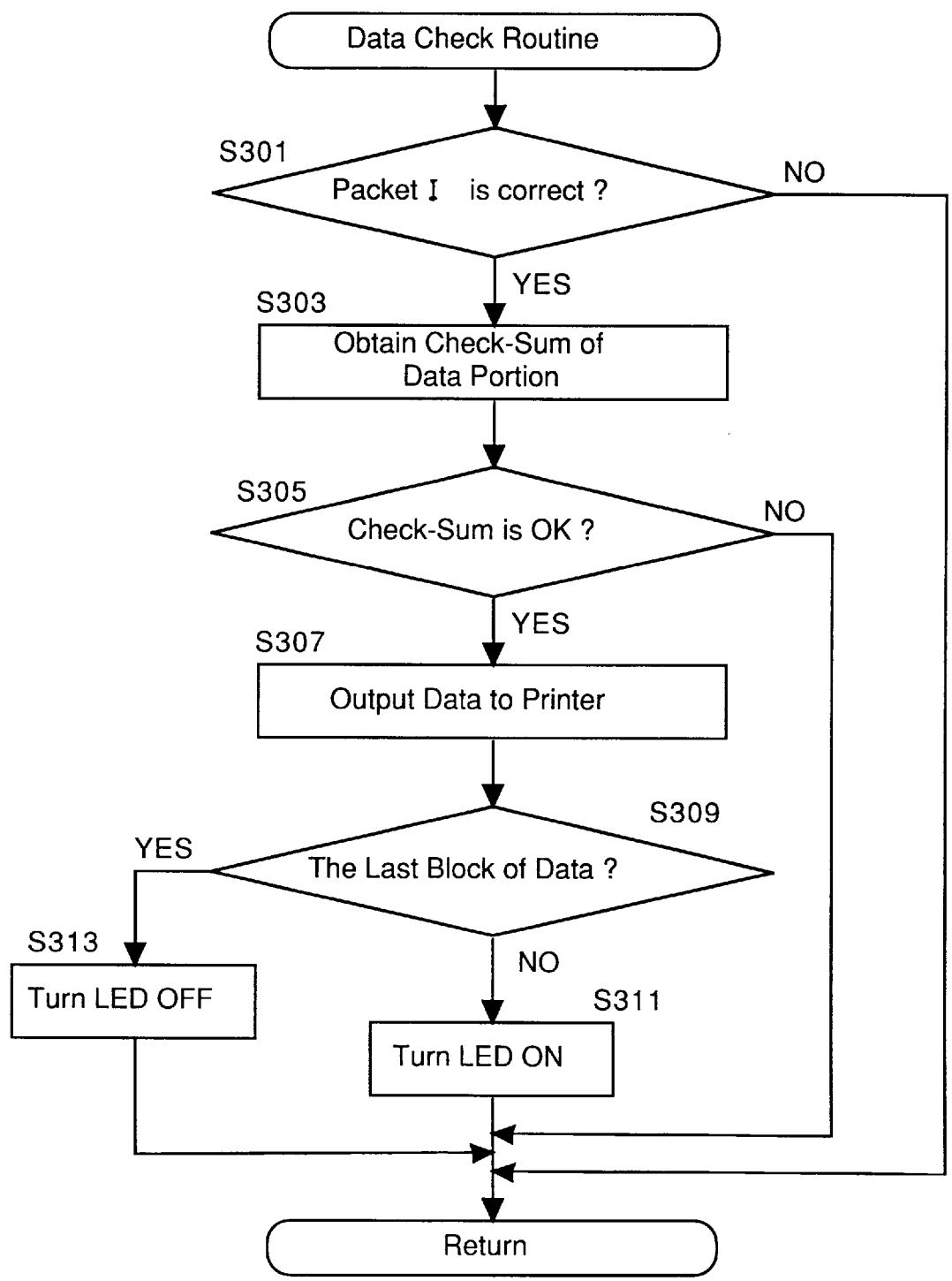

OPTICAL DATA COMMUNICATION SYSTEM AND PRINTER

BACKGROUND OF THE INVENTION

1. Field of the Invention

The present invention relates to an optical data communication system and a printer which receives printing data through the optical data communication system.

2. Description of the Related Art

There have been developed small portable printers for personal computers. The portable printer is not installed at a specific place but is put on a user's desk or the like when it is used. Printing data is sent to the portable printer from a personal computer or a portable data communication device through a data transmission means such as an interface or a cable which connects the printer and the personal computer.

Recently, infrared data transmission means using no cables have been proposed. In the infrared data communications system, the data transmitter and the data receiver are provided with light emitting elements and light receiving elements that transmit and receive printing data in accordance with a predetermined communication protocol, respectively.

However, the conventional data communication means are not provided with a display which indicates the communication state. Consequently, even if the printing operation is not correctly completed, a user cannot be informed of such an incomplete printing operation.

SUMMARY OF THE INVENTION

It is an object of the present invention to provide an optical printing data communication system in which the communication state can be visually confirmed.

To achieve the object mentioned above, according to an aspect of the present invention, there is provided an optical communication system for a printer comprises means for emitting a radiation for transmitting a printing data, means for receiving the printing data transmitted with the radiation, a printer body to which the printing data is supplied through the receiving means, means for detecting a state of data transmission of the printing data, means for indicating the state of transmission in accordance with the detecting means so that the state of printing data transmission is visible to a user.

Preferably, the receiving means comprises an adapter that is detachably attached to the printer body, and the indicating means is provided on the adapter.

Furthermore, it is preferable that the printing data supplying means comprises a personal computer, and the indicating means comprises an LED. It is also possible to arrange the LED to be lit in a different manners in accordance with the detecting means.

The present disclosure relates to the subject matter contained in Japanese patent application No. 7-116025 (filed on May 15, 1995), which is expressly incorporated herein by reference in its entirety.

BRIEF DESCRIPTION OF THE DRAWINGS

The invention will be described below in detail with reference to the accompanying drawings, in which;

FIGS. 5 and 6 are flow charts of a sub-routine of operations of an adapter.

DESCRIPTION OF THE PREFERRED EMBODIMENT

Figure 1:
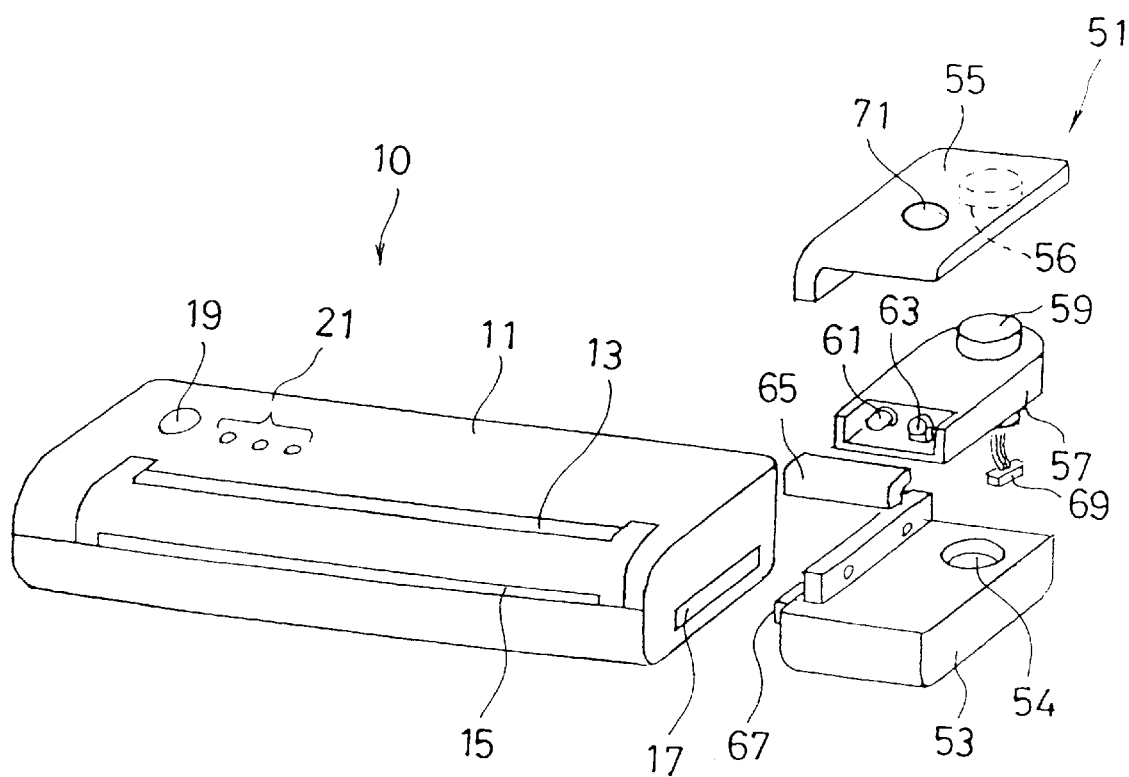
FIG. 1 is an exploded perspective view of an optical data communication system in connection with a printer, according to an embodiment of the present invention.
Figure 2:
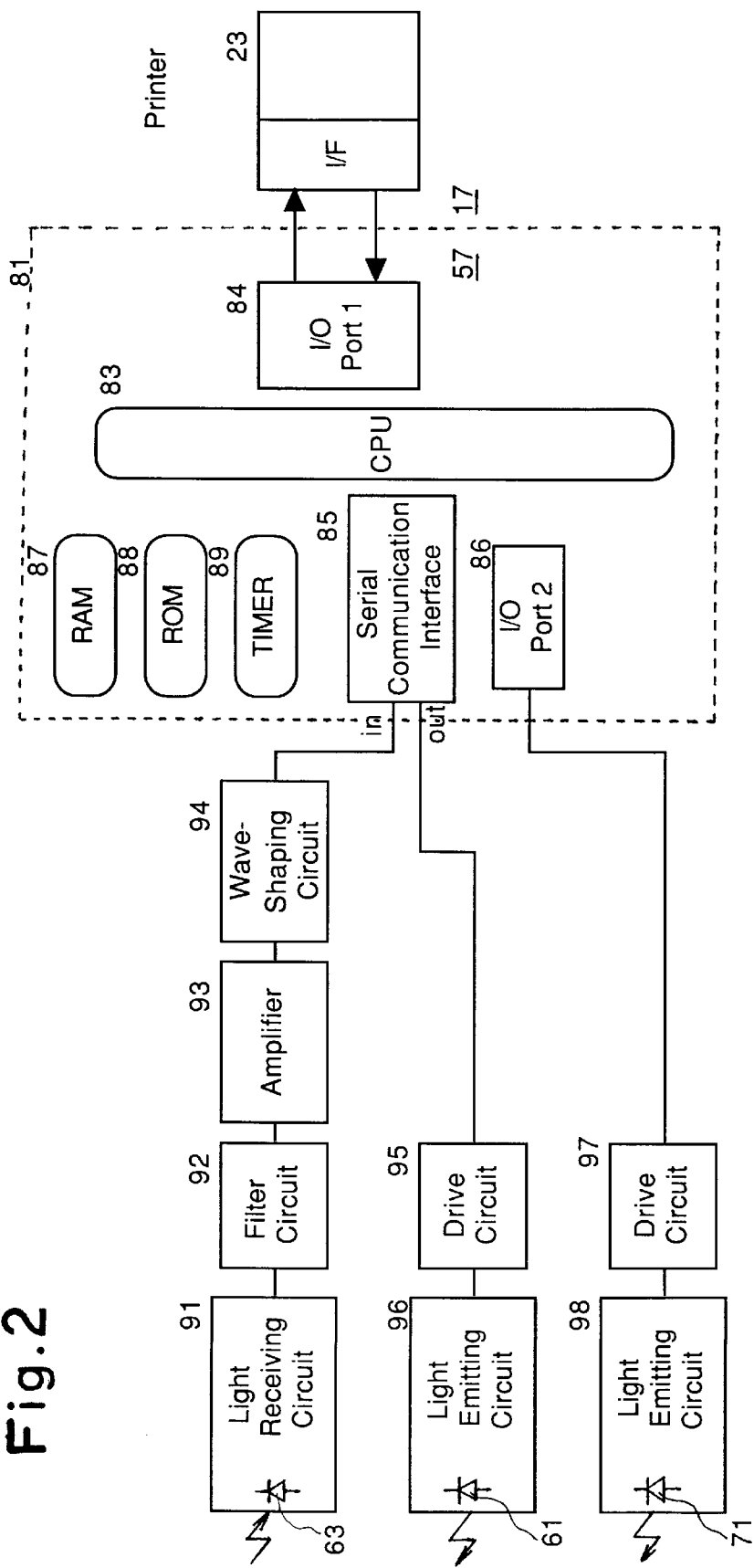
FIG. 2 is a block diagram of a circuit of an optical data communication system shown in FIG. 1.

FIG. 1 shows a printer 10 and a printer communication adapter 51 (hereinafter, the adapter), to which an optical data communication system according to the present invention is applied. As shown in FIG. 1, the adapter 51 is depicted as a perspective view to show a disassembled state of the adapter 51. FIG. 2 shows an embodiment of a circuit in the adapter 51.

It should be noted that the optical communication mentioned in embodiment means a type of radio communication, in which a light ray is used to transmit sound, images, data pulses and so forth. In other words, in this embodiment, the optical data communication can be defined as a data communication without employing cables actually connecting target apparatuses. The printer 10 which is a thermal-line printer has a printer body 11 which is provided on the upper surface thereof with a paper feed port 13 and on the front surface thereof with a paper discharge port 15. Furthermore, the printer body 11 is provided on the side surface with a printing data receiving connector 17. On the upper surface of the printer body 11 are also provided a power button 19 and an indicating LED 21, which indicates the functions of the printer 10. As is well known, there are printer elements (not shown), such as a printing mechanism having a thermal head, a battery, a print control circuit, a printing data communication circuit, and so forth, in the printer body 11.

The adapter 51, which communicates with a printing data transmission means, such as a personal computer 31 (FIG. 3), is attached to the printer body 11. The printer 10 carries out the printing operation in accordance with printing data supplied through the adapter 51. The adapter 51 comprises an adapter body 53 and an upper cover 55 attached to the adapter body 53. A data transmitting and receiving portion 57 is provided to rotate about a shaft 59 in the space defined by the adapter body 53 and the cover 55.

The data transmitting and receiving portion 57 comprises an infrared light emitter (infrared-radiation emitting diode, i.e., infrared LED) 61 and an infrared light receiver (photodiode) 63. An infrared filter 65 is provided in front of the infrared LED 61 and the photodiode 63. The photodiode 63 converts optical data output from the personal computer 31 as infrared pulse signals into electrical signals. The infrared LED 61 emits a predetermined response data as infrared pulse signals. It should be noted that there are various communication protocols in accordance with which the embodiment of the invention is constructed. In this embodiment, the adapter 51 and the printer 10 can be operated in accordance with any one of the various protocols.

The shaft 59 projects upwardly and downwardly from the upper and bottom surfaces of the data transmitting and receiving portion 57, so that the upper and lower projections of the shaft 59 are fitted in a shaft receiving hole 54 and a shaft receiving recess 56 formed in the adapter body 53 and the upper cover 55, respectively. The data transmitting and receiving portion 57 is rotatable about the shaft 59 within a range of approximately 180 degrees.

The adapter body 53 is provided on the side surface thereof with a connector 67, which can be connected to the connector 17 of the printer body 11. When the connectors 67 and 17 are connected, the adapter 51 is connected to the printer body 11. The connector 67 is connected to a cable 69 connected to the control circuit of the data transmitting and receiving portion 57 (FIG. 2). The cable 69 extends in the hollow shaft 59, comes out of the shaft 59 at the bottom end, and the cable 69 is connected to the connector 67.

An indicating LED 71 is provided on the outer surface of the upper cover 55 to indicate the data communication state with respect to the printing operations.

FIG. 2 shows the communication circuit incorporated in the adapter 51, by way of example. The communication circuit includes a microcomputer 81 as a control means for controlling the print data communication. The microcomputer 81 includes a CPU 83, which controls the data communication, and an interface including a first I/O port 84, which transmits the printing data to printer body 11, a serial communications interface 85, which transmits and receives the printing data using infrared radiation between the personal computer 31 and the microcomputer 81, and a second I/O port 86, which controls the indicating LED 71. The microcomputer 81 is also provided therein with a RAM 87, which stores the printing data input thereto, a ROM 88, which stores the communication protocols, and so forth, and a timer 89, which counts an interruption time to indicate how long the communication is interrupted.

The photodiode 63 is connected to a light receiving circuit 91, which converts the infrared radiation to an electric current signal, which is sent to a filter circuit 92 to remove a noise component, such as a direct current component or a high frequency component, and so forth. The electric current signal is amplified by an amplifier 93 and is thereafter modified by a wave-shaping circuit 94. The signal is then supplied as a pulse signal to the microcomputer 81 through a serial communication interface 85.

An infrared LED 61 is controlled by the microcomputer 81 through a drive circuit 95 and a light emitting circuit 96. An indicating LED 71 is controlled by the microcomputer 81 through a drive circuit 97 and a light emitting circuit 98.

As explained the power is supplied to the adapter 51 from a power source of the printer 10 in the illustrated embodiment, it is also possible to provide another type of power source such as a battery in the adapter 51.

Figure 3:
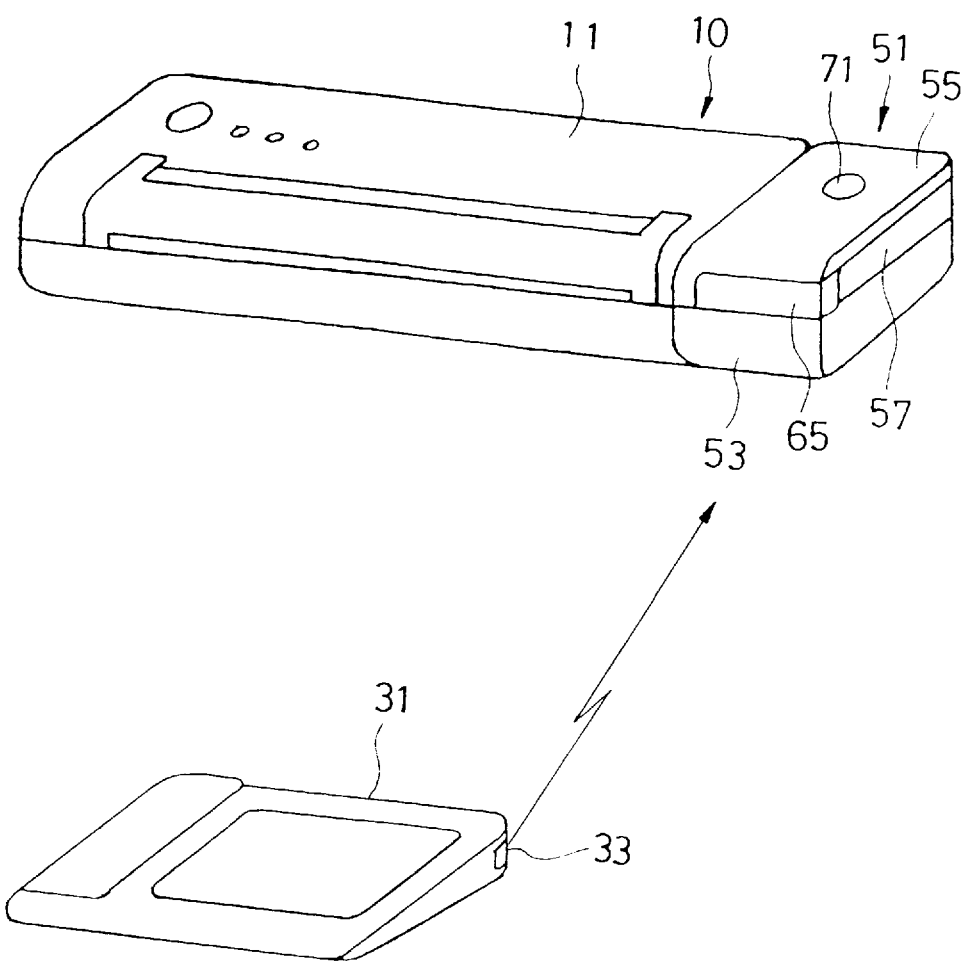
FIG. 3 is a perspective view of an optical data communication system shown in FIG. 1, applied to a printer.

In FIG. 3, the adapter 51 is attached to the printer 10, and a portable personal computer 31 as a printing data transmitting means is shown. The personal computer 31 is provided with an optical data transmitting and receiving portion (light emitting and receiving portion) 33 as an interface, having infrared radiation emitter and receiver (not shown) incorporated herein. The personal computer 31 transmits and receives the infrared pulse signals through the optical data transmitting and receiving portion 33. Namely, upon printing, the optical data transmitting and receiving portion 33 converts the printing data into the infrared pulse signals in accordance with a predetermined communication protocol and receives predetermined infrared pulse signals from the adapter 51.

There are various communication protocols depending on the types of the printers. The following discussion will be addressed to a serial packet transmission by way of example. The packet includes a header including commands and block addresses, and a data portion.

The communication operations in the present invention will be discussed below with reference to the flow charts shown in FIGS. 4 through 6. The communication operations are carried out by the microcomputer 81 (CPU 83) in accordance with a predetermined program stored in the ROM 88.

Figure 4:
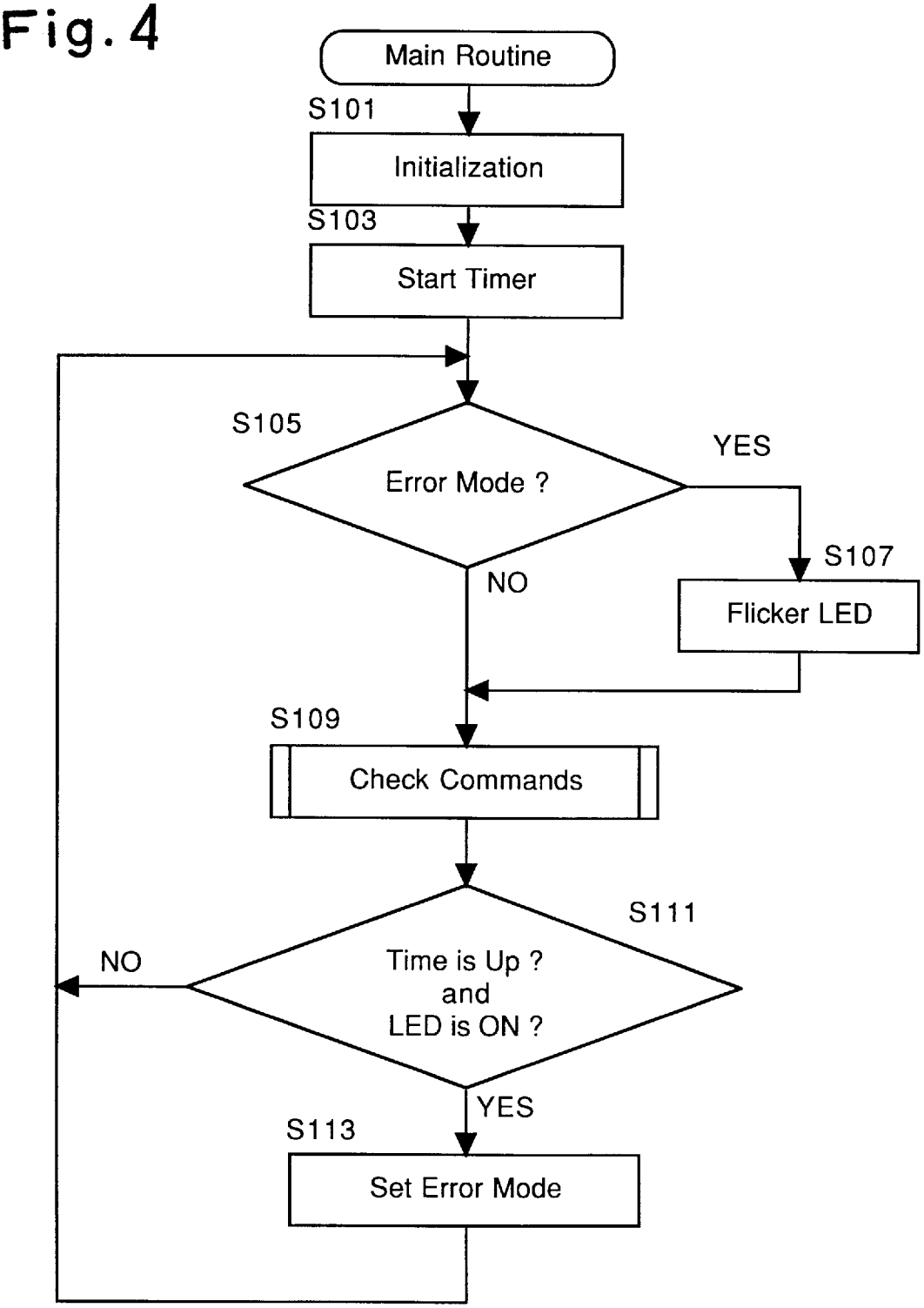
FIG. 4 is a flow chart of operations of an adapter.
Figure 5:
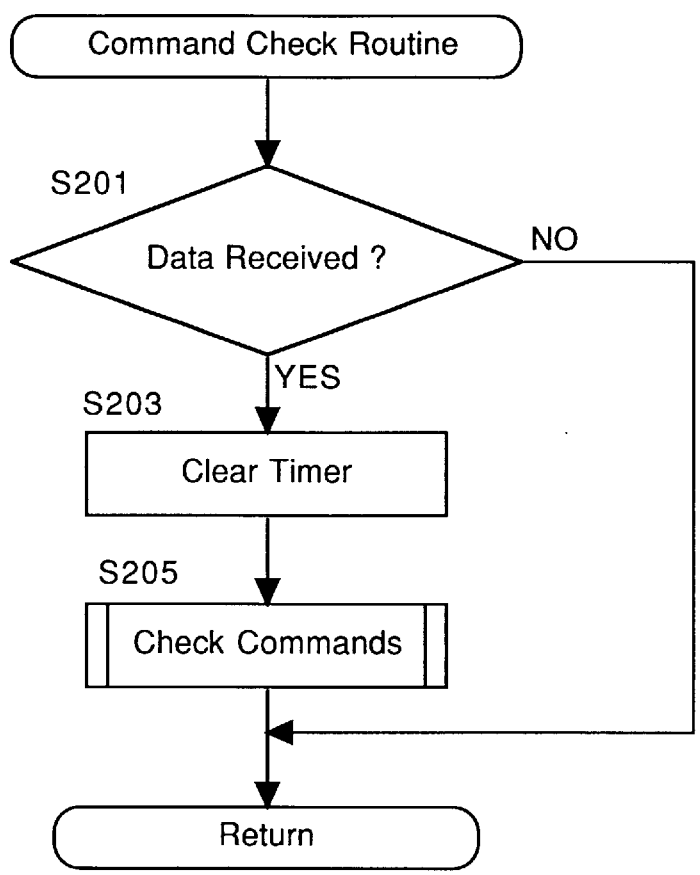

FIG. 4 shows a main routine of the operations of the adapter 51. When the adapter 51 is attached to the printer body 11, and when the power button 19 of the printer 10 is turned ON, the control enters the main routine shown in FIG. 4. In the main routine, the I/O port 84, the RAM 87, and the timer 89 are initialized at step S101. The timer 89 starts at step S103. The timer 89 counts the time to detect that no communication is carried out for a predetermined period of time.

Before the printing data communication begins, whether or not the error mode is set is checked at step S105. If no error mode is set, the control proceeds to step S109 to perform the command-check operations (sub-routine).

In the sub-routine for the command-check operations, whether or not data has been received is checked at step S201. If no data is received, the control is returned. Whether the time counted by the timer 89 is up and whether the indicating LED 71 is activated are checked at step S111. The time counted by the timer 89 is up when a predetermined time lapses after the power button 19 of the printer 10 is turned ON. However, if the indicating LED 71 is not activated, the control is returned to step S105.

The operations from step S105 to S111 are repeated until the printing data is supplied while the power is supplied. When the printing data is sent, whether or not the error mode is set is checked at step S103. If no error mode is set, the command-check sub-routine is called (step S109). In the sub-routine for the command-check operations, whether or not data is received is checked (S201). Since the data is received, the timer 89 is cleared at step S203. Thereafter, the sub-routine for the data-check operations is called (step S205).

In the data-check sub-routine, whether or not the packet data I is received is checked at S301. If the packet data I is received, the check-sum of the data portion is fetched (S303), and thereafter, whether or not the data is completely received in accordance with the check-sum is checked at step S305. If the check-sum is correct, the printing data stored in the RAM 87 is sent to the printer 10 (S307). Thereafter, whether or not the output printing data belongs to the last block of the packet data I is checked (S309). If the printing data is not the last block, the indicating LED 71 is activated (S311), and the control is returned to the main routine.

When the control is returned to the main routine, whether the time counted by the timer 89 is up and whether the indicating LED 71 is ON are checked. Since the time is not up, the control is returned to step S105.

The loop of steps S105, S109, S201, S203, S205, S301, S303, S305, S307, S309, S311, S111 is repeated until the data communication is completed. In this operation loop, since the indicating LED 71 is ON, a user can visually recognize that the printing operations will be carried out.

If the last block of data is sent to the printer 10 in the above loop, the indicating LED 71 is turned OFF (S309 and S311). Thus, the user can visually recognize that all the printing data is transferred to the printer 10 and the communication ends.

If the printing data communication is not completed by a mistaken operation or an error, this can be recognized by the user as follows:

During the printing data transmission, the indicating LED 71 is activated in the operation loop mentioned above. In the loop, if the personal computer 31 or the printer 10 is moved or the personal computer 31 is disconnected from the adapter 51 by a mistake, the data communication is interrupted for a predetermined period of time. Furthermore, for example, if no printing data can be transferred to the printer 10 because of an absence of the paper to be fed into the printer 10, no printing data can be received for a predetermined period of time. Then, the control skips steps S203 and S205. Consequently, the timer 89 is not cleared, i.e., the timer 89 is still counting time. If the defective state continues for a predetermined period of time, the timer 89 is up, so that the indicating LED 71 is turned ON. Consequently, the control proceeds to step S113 from step S111 to set the error mode. Thereafter, the control proceeds to step S107 from step S105 to flicker the indicating LED 71.

Since the indicating LED 71 is flickered when the printing operation is not completed as mentioned above, the user can visually recognize a malfunction of the printing data transmission. It should be noted that the adapter 51 is usually reset by turning the power button 19 of the printer 10 ON and OFF.

As explained, in the illustrated embodiment of the present invention, the indicating LED 71 is lit during the communications of the printing data, and the indicating LED 71 is turned OFF when the data communication is completed. If the transmission of the printing data is interrupted for a predetermined time, the indicating LED 71 is flickered.

The single indicating LED 71 is lit during the data communication, and flickered in case of the malfunction of the printing data transmission in the illustrated embodiment, it is also possible to vary the period of flicker depending on the normal data communication or the malfunction of the printing data transmission. Alternatively, it is possible to provide a plurality of LEDs having different colors (e.g., green LED and red LED) for the normal data communication and the malfunction of the printing data transmission. A light emitter (LED) can be provided on the printer 10, or existing light emitter provided on the printer 10 can be utilized. Moreover, the indicating element is not limited to the LED and can be made of, for example, an electric lamp or other types of light emitting elements.

As can be understood from the above discussion, according to the present invention, the normal data communications and the malfunction of the printing data transmission are indicated by different ways or indications, the user can visually recognize that the data communications are properly correctly completed or not.

What is claimed is:

1. A radio communication system for a printer, comprising:

means for emitting a radiation for transmitting a printing data;

means for receiving said printing data transmitted with said radiation;

a printer body to which said printing data is supplied through said receiving means, said receiving means comprising an adapter detachably attached to said printer body;

means for detecting a state of data transmission of said printing data; and means provided on said adapter for indicating said state of transmission in accordance with said detecting means so that said state of printing data transmission is visible to a user, said indicating means being activated when said detecting means detects said state of data transmission;

wherein said adapter includes means for emitting a response data to said means for emitting a radiation.

2. The radio communication apparatus for the printer according to claim 1, wherein said radiation to be used to transmit said printing data is an infrared light ray.

3. The radio communication system for the printer according to claim 1, wherein said radiation emitting means comprises a personal computer.

4. The radio communication system for the printer according to claim 1, wherein said indicating means comprises an LED.

5. The radio communication system for the printer according to claim 4, wherein said LED is arranged to be lit in a different manners in accordance with said detecting means.

6. The radio communication system for the printer according to claim 5, wherein said LED is arranged to be lit when said detecting means detects that said printing data is properly transmitted.

7. The radio communication system for the printer according to claim 5, wherein said LED is arranged to be flickered when said detecting means detects that said printing data is not properly transmitted.

8. A method for indicating a state of printing data transmission in a radio communication system for a printer, said method comprising the following steps:

(1) providing a printing data in a packet data form;

(2) checking a transmission state of said printing data;

(3) turning an indicator ON to visibly indicate a normal printing data transmission when said printing data is being properly transmitted;

(4) turning said indicator OFF to indicate the end of said printing data transmission when the last block of said printing data in said packet form has been transmitted;

(5) turning said indicator flickered to visually indicate a malfunction of said printing data transmission if said indicator is instructed to be turned ON according to said step (3) and a lapse of a predetermined time.

9. The method according to claim 8, wherein said predetermined time is determined by a timer that is to be started subsequent to an initialization of said system.

10. The method according to claim 8, wherein said steps (1) and (5) are performed in a main routine of said system.

11. The method according to claim 8, wherein said steps (2), (3) and (4) are performed in a sub-routine.

12. The method according to claim 11, wherein said system comprises a personal computer to emit said printing data in a form of a radiation, an adapter to receive said printing data, and a printer body to which said adapter is detachable attached, and wherein said main routine and said sub-routine are provided in a control means in said adapter.

* * * * *